US010068472B2

(12) United States Patent
Young

(10) Patent No.: US 10,068,472 B2
(45) Date of Patent: Sep. 4, 2018

(54) AUTOMOTIVE LANE DISCIPLINE SYSTEM, METHOD, AND APPARATUS

(71) Applicant: Autoliv ASP, Inc., Ogden, UT (US)

(72) Inventor: James M. Young, Brighton, MI (US)

(73) Assignee: VEONEER US, INC., Southfield, MI (US)

( * ) Notice: Subject to any disclaimer, the term of this patent is extended or adjusted under 35 U.S.C. 154(b) by 273 days.

(21) Appl. No.: 14/298,133

(22) Filed: Jun. 6, 2014

(65) Prior Publication Data

US 2015/0356869 A1 Dec. 10, 2015

(51) Int. Cl.
G08G 1/00 (2006.01)
G08G 1/16 (2006.01)
G08G 1/07 (2006.01)
G08G 1/09 (2006.01)
B60R 25/10 (2013.01)
B60Q 1/00 (2006.01)
B60Q 1/50 (2006.01)
B60Q 1/54 (2006.01)
B60Q 1/52 (2006.01)
B60Q 5/00 (2006.01)
B60Q 1/34 (2006.01)
G08G 1/0962 (2006.01)
G08G 1/01 (2006.01)
G08G 1/052 (2006.01)
B60Q 9/00 (2006.01)

(52) U.S. Cl.
CPC ............ G08G 1/0962 (2013.01); B60Q 1/50 (2013.01); B60Q 9/008 (2013.01); G08G 1/0133 (2013.01); G08G 1/052 (2013.01); G08G 1/09623 (2013.01)

(58) Field of Classification Search
CPC ...... G08G 1/167; G08G 1/166; G08G 1/0962; G08G 1/09; G01L 19/08
See application file for complete search history.

(56) References Cited

U.S. PATENT DOCUMENTS

| 5,521,579 | A | * | 5/1996 | Bernhard | ........... B60K 31/0008 180/167 |
| 5,537,110 | A | * | 7/1996 | Iida | .......................... G08G 1/04 340/933 |
| 5,555,555 | A | * | 9/1996 | Sato | ...................... G06K 9/4633 382/104 |
| 6,218,960 | B1 | * | 4/2001 | Ishikawa | ................ G08G 1/167 340/435 |
| 6,411,889 | B1 | * | 6/2002 | Mizunuma | ........... G07B 15/063 340/928 |

(Continued)

FOREIGN PATENT DOCUMENTS

EP          2944531 A1 * 11/2015 ............ B60W 30/14
WO     WO 9958358 A1 * 11/1999 ............. B60R 21/01

Primary Examiner — Steven Lim
Assistant Examiner — Muhammad Adnan
(74) Attorney, Agent, or Firm — Brinks Gilson & Lione

(57) ABSTRACT

A method and apparatus for assisting a driver of a first vehicle determines whether the first vehicle is traveling in a first lane of a multi-lane highway. The method further determines that another vehicle is approaching the first vehicle from behind in a second lane of the multi-lane highway. The method determines that the first vehicle is being passed by the second vehicle, and outputs a warning to the driver, instructing the driver to merge into the second lane where the second vehicle had been traveling.

20 Claims, 7 Drawing Sheets

(56) References Cited

U.S. PATENT DOCUMENTS

| | | | | |
|---|---|---|---|---|
| 7,205,904 B2* | 4/2007 | Schofield | ............... | B60Q 1/346 340/435 |
| 8,040,253 B2* | 10/2011 | Kaller | .................. | B60Q 9/008 340/435 |
| 8,072,351 B1* | 12/2011 | Absher, II | .............. | B60Q 9/008 340/425.5 |
| 8,466,806 B2 | 6/2013 | Schofield | | |
| 9,751,463 B1* | 9/2017 | Ramcharitar | ............ | B60Q 9/00 |
| 2004/0193347 A1* | 9/2004 | Harumoto | ........... | B60R 21/0132 701/45 |
| 2005/0004744 A1* | 1/2005 | Dieckmann | ........ | B60K 31/0008 701/96 |
| 2005/0015203 A1* | 1/2005 | Nishira | .................. | G08G 1/167 701/301 |
| 2007/0213896 A1* | 9/2007 | Fischer | .................. | G01C 21/26 701/33.4 |
| 2008/0046150 A1* | 2/2008 | Breed | ................. | B60R 21/0134 701/45 |
| 2008/0230297 A1* | 9/2008 | Lee | ....................... | B60W 40/08 180/271 |
| 2009/0012709 A1* | 1/2009 | Miyazaki | ................. | G01C 21/26 701/514 |
| 2009/0024309 A1* | 1/2009 | Crucs | .................... | G08G 1/015 701/118 |
| 2009/0265061 A1* | 10/2009 | Watanabe | .............. | G08G 1/165 701/36 |
| 2009/0306852 A1* | 12/2009 | Ikeda | ..................... | B60W 50/14 701/36 |
| 2010/0134325 A1* | 6/2010 | Gomi | ........................ | B60R 1/00 340/995.14 |
| 2011/0032119 A1* | 2/2011 | Pfeiffer | .................. | B60K 35/00 340/905 |
| 2011/0246051 A1* | 10/2011 | Vang | .................... | G08G 1/0962 701/117 |
| 2012/0150437 A1* | 6/2012 | Zeng | ..................... | B60W 30/12 701/456 |
| 2012/0162265 A1* | 6/2012 | Heinrich | .......... | G06Q 10/06393 345/661 |
| 2012/0283942 A1* | 11/2012 | T'Siobbel | .............. | G01C 21/26 701/410 |
| 2012/0296522 A1* | 11/2012 | Otuka | .................... | G08G 1/167 701/41 |
| 2013/0050491 A1* | 2/2013 | Lin | ....................... | G08G 1/0962 348/148 |
| 2013/0085976 A1* | 4/2013 | Bone | ............... | B60W 30/18163 706/46 |
| 2013/0113618 A1* | 5/2013 | Flanagan | ............... | G08G 1/166 340/539.1 |
| 2013/0250112 A1* | 9/2013 | Breed | ................... | B60R 19/205 348/148 |
| 2014/0002658 A1* | 1/2014 | Kim | ....................... | B60Q 9/008 348/148 |
| 2014/0074356 A1* | 3/2014 | Bone | ...................... | G08G 1/167 701/41 |
| 2014/0176321 A1* | 6/2014 | Chen | ..................... | B60W 30/14 340/435 |
| 2015/0194055 A1* | 7/2015 | Maass | .................. | B60W 50/14 340/905 |
| 2015/0194082 A1* | 7/2015 | McEwan | ............... | G09F 21/048 40/209 |
| 2015/0302750 A1* | 10/2015 | Choi | ...................... | G08G 1/143 340/932.2 |
| 2016/0363935 A1* | 12/2016 | Shuster | .................... | B60L 7/10 |

* cited by examiner

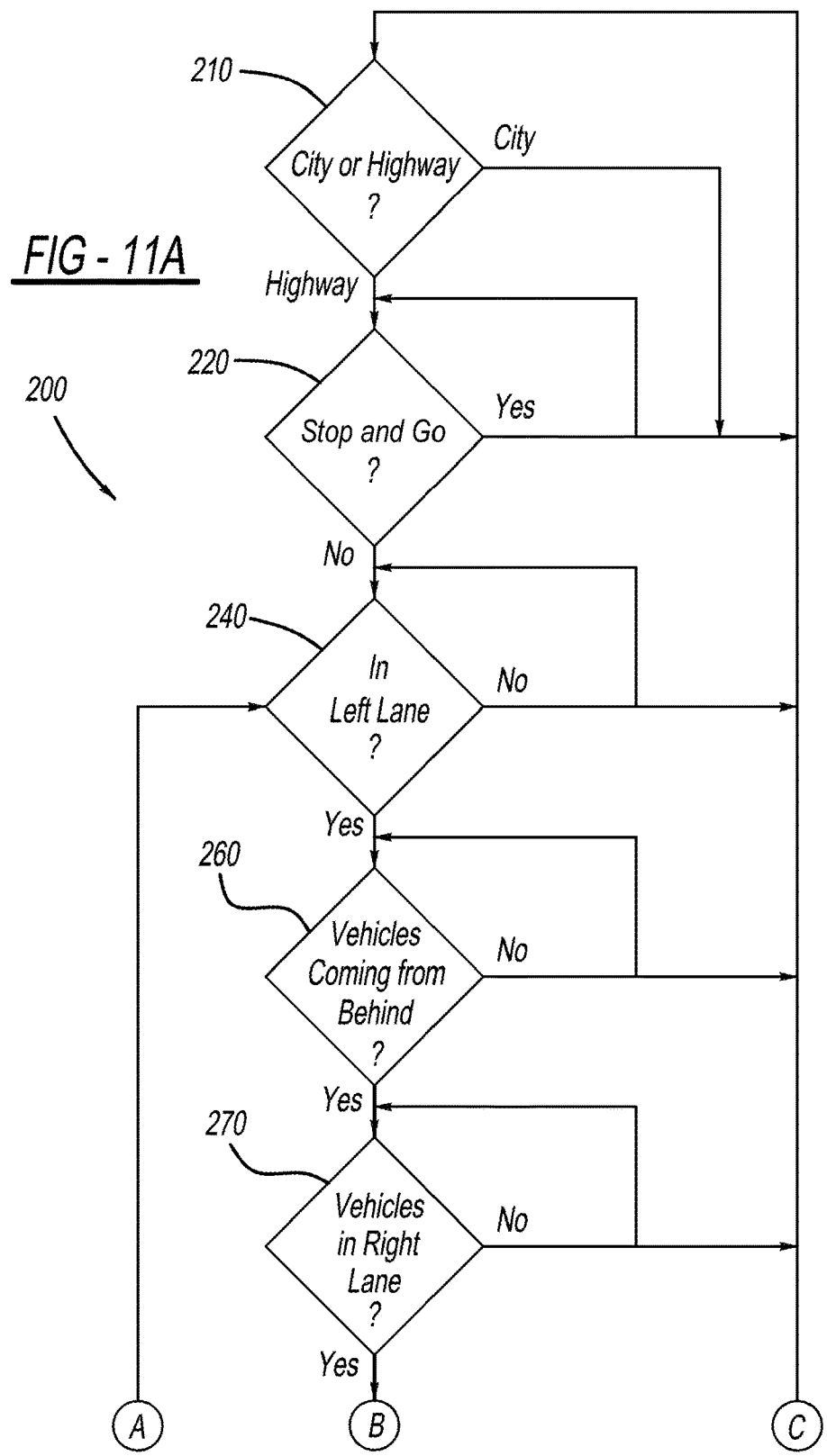

US 10,068,472 B2

AUTOMOTIVE LANE DISCIPLINE SYSTEM, METHOD, AND APPARATUS

BACKGROUND

1. Field of the Invention

The present invention relates generally to automotive lane monitoring systems and, more particularly, to a lane discipline system.

2. Description of Related Art

Various driver assistance systems are now available including automotive lane monitoring systems that can provide assistance to a driver of an automotive vehicle.

One type of driver assistance system is a lane departure warning ("LDW") system. A LDW system is able to detect whether a vehicle is departing or about to depart from the lane in which it is currently driving. Various technologies including visual and infrared cameras with associated image processing are used in this system to warn the driver. Systems of this type operate to warn a driver of the potential lane departure such that the driver can correct this lane departure, if desired, and return to the current lane in which the vehicle is operating.

Another type of driver assistance system is a Blind Spot Detection ("BSD") system. The BSD system is able to detect whether another vehicle is present in the blind spot of the driver's vehicle on the left and/or right side of the vehicle. BSD systems typically include radar-based detection and associated processing to warn the driver. Systems of these types can warn the driver of the presence of another vehicle in the blind spot, such that the driver can remain in the current lane.

These systems operate to warn the vehicle driver to remain in a traffic lane. The warnings can take a variety of forms, such as audible warnings (beeping), visual warnings (flashing lights), haptic warnings (vibration), or the like.

On multi-lane roads, meaning roads that have more than one lane assigned to the same direction of vehicle travel such as divided highways, efficient traffic flow is aided by proper use of the lanes. It is a generally accepted practice in the United States, and in some states and countries it is the law, that slower traffic use the right-most lane, with faster traffic using one of the left-most lanes to pass the slower moving traffic.

However, in many cases, drivers fail to follow this convention. This can be due to a variety of reasons. The driver may be unaware of the convention. The driver may not understand the benefits to traffic efficiency and view the practice as a suggestion. The driver may have initially used the left lane to pass but forgotten to return to the right lane after passing. The driver may have become distracted. Some drivers may view the left hand lane as the "fast lane" and be drawn to traveling in that lane because they don't think of themselves as a slow driver.

In any event, drivers that use the left lane for purposes other than passing slower vehicles will often need to be passed by faster moving vehicles. With the left lane occupied by a slower moving vehicle, the faster moving vehicle will need to pass using a lane on the right. Passing on the right goes against the typical passing convention described above, but is necessitated by the left lane being occupied by a slower driver. The existence of a slower vehicle in the left lane can cause frustration in other drivers and can lead to aggressive, frustrated, and/or angry driving when passing on the right.

SUMMARY

A method for assisting a driver of a motor vehicle is provided. The method includes the steps of detecting, using a controller installed within a passenger vehicle, that the passenger vehicle is traveling on a roadway having at least two lanes for travel in a first direction and detecting that the passenger vehicle is traveling in a first lane of the at least two lanes. The method further includes detecting that a second vehicle is traveling in a second lane of the at least two lanes, wherein the second lane is different than the first lane, detecting that the second vehicle is behind the passenger vehicle, and detecting that the second vehicle is traveling faster than the passenger vehicle. The method further includes outputting a warning from the controller to the driver, wherein the warning instructs the driver to depart from the first lane.

In another approach, a system for providing lane discipline assistance to a driver of a first vehicle is provided. The system includes a computer readable medium having instructions stored thereon that, when executing by a computing device, cause the computing device to perform steps including: detecting, via a lane detect function, that the first vehicle is traveling in a first lane of a multi-lane highway; detecting, via a vehicle detect function, that a second vehicle is traveling in a second lane of the multi-lane highway at a faster speed than the first vehicle; determining that the second vehicle has passed the first vehicle; and outputting a warning in response to determining that the second vehicle has passed the first vehicle.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 11A and 11B are an illustration of another method for assisting a vehicle driver.

DETAILED DESCRIPTION

Figure 1:
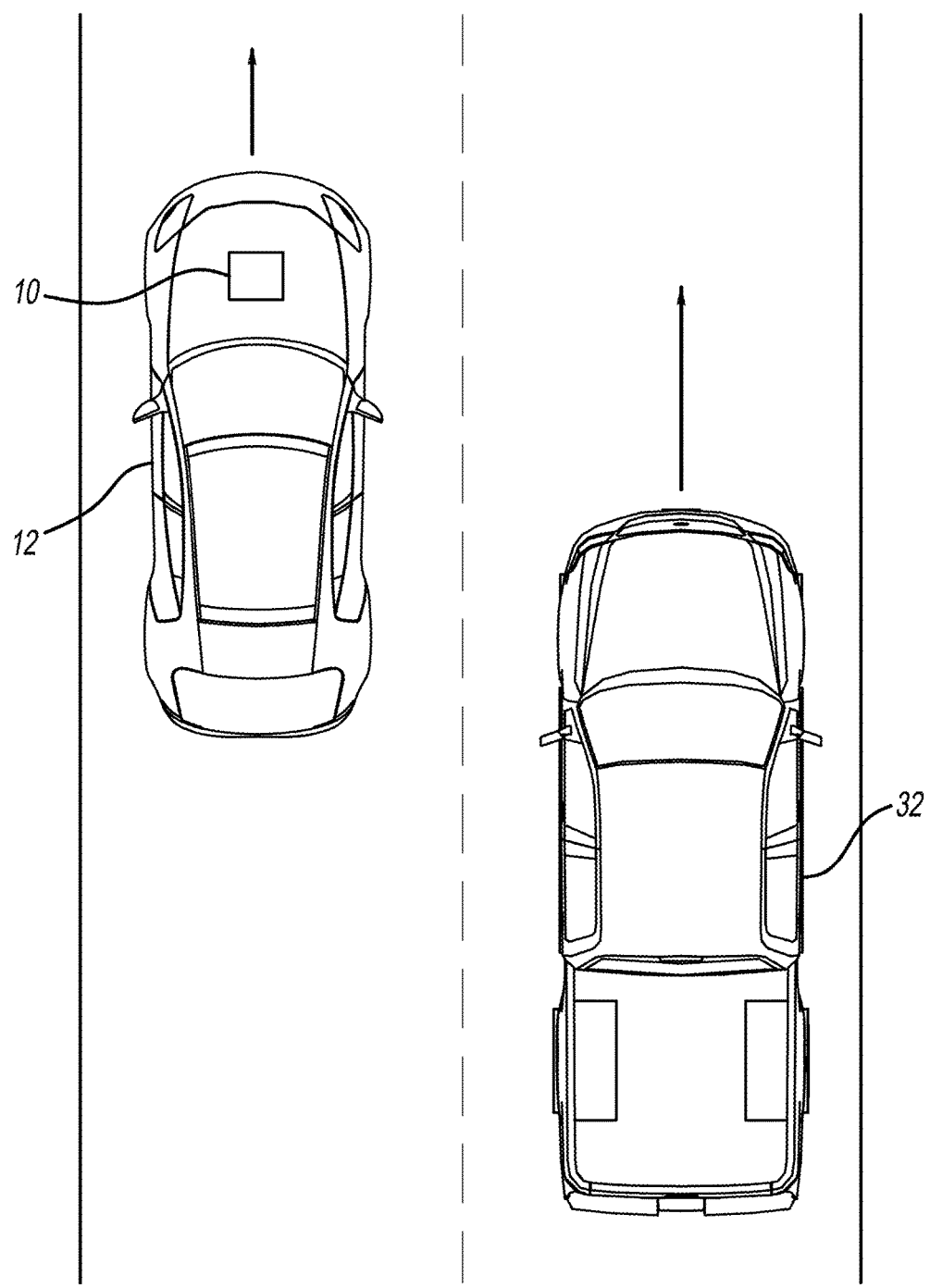
FIG. 1 is a top view of a first vehicle traveling in the left lane of a multi-lane highway, and a second vehicle traveling in the right lane.
Figure 2:
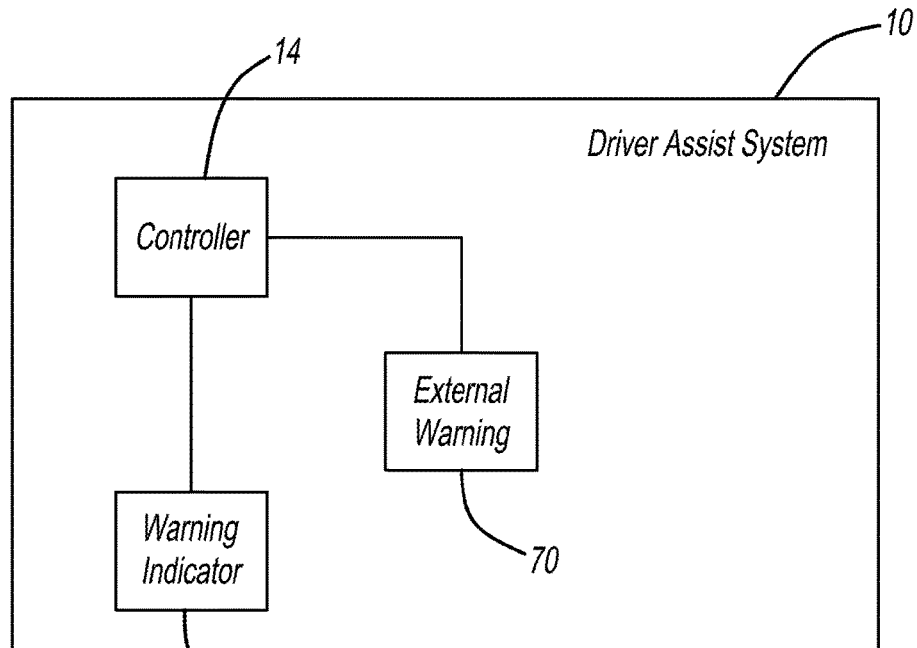
FIG. 2 is a schematic view of a driver assist system having a controller, a warning indicator, and an external warning.

Turning now to FIGS. 1-11, one embodiment of a driver assist system 10 for use with a vehicle 12 includes a controller 14, as shown in FIG. 2. The controller 14 is in the form including a computer readable medium, such as a hard drive, flash storage, or the like, that includes instructions stored thereon, as well as a processor that can execute the instructions. The controller 14 can therefore include various algorithms and processes that are carried out in response to inputs, such as vehicle status, vehicle environment, and outputs from other controllers or devices. As shown in FIG. 2, the system 10 further includes a warning indicator 16 that is operatively coupled to the controller 14 that is activated in response to the controller 14 determining that a warning is to be activated.

Figure 3:
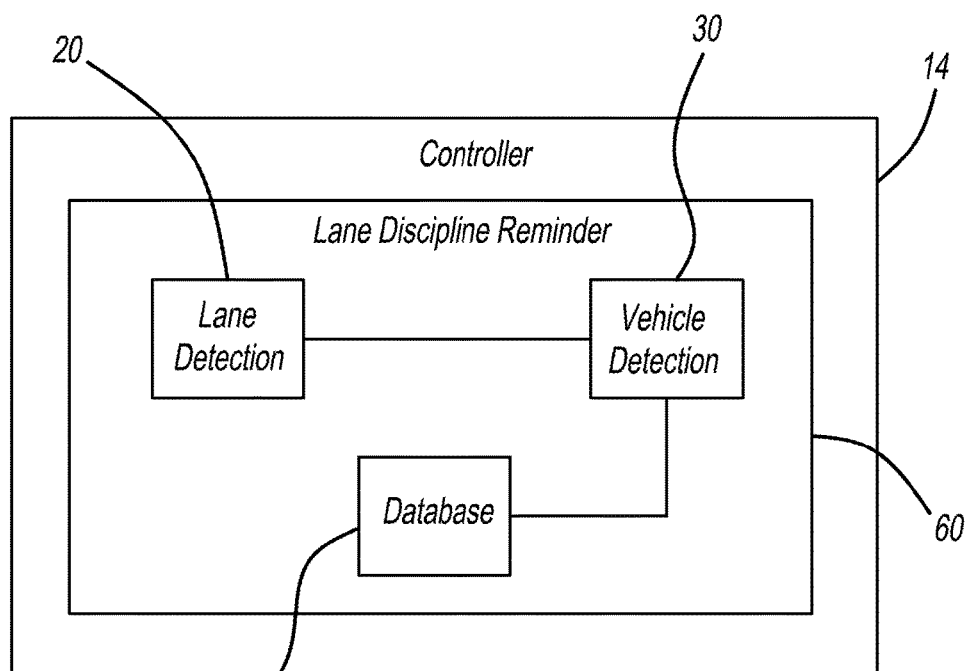
FIG. 3 is a schematic view of the controller having a lane discipline reminder function including a lane detection function, a vehicle detection function, and a database.

As shown in FIG. 3, the system 10 and controller 14 includes a lane detection function 20. The lane detection function 20 detects the environment of the vehicle 12 on the roadway. More specifically, the lane detection function 20 detects the type of road that the vehicle 12 is driving on, as well as the particular lane of the road that the vehicle 12 is driving on. The lane detection function 20 determines whether the vehicle is driving on a multi-lane highway. The lane detection function 20 further determines whether the vehicle 12 is driving in the left lane of a multi-lane highway.

Figure 4:
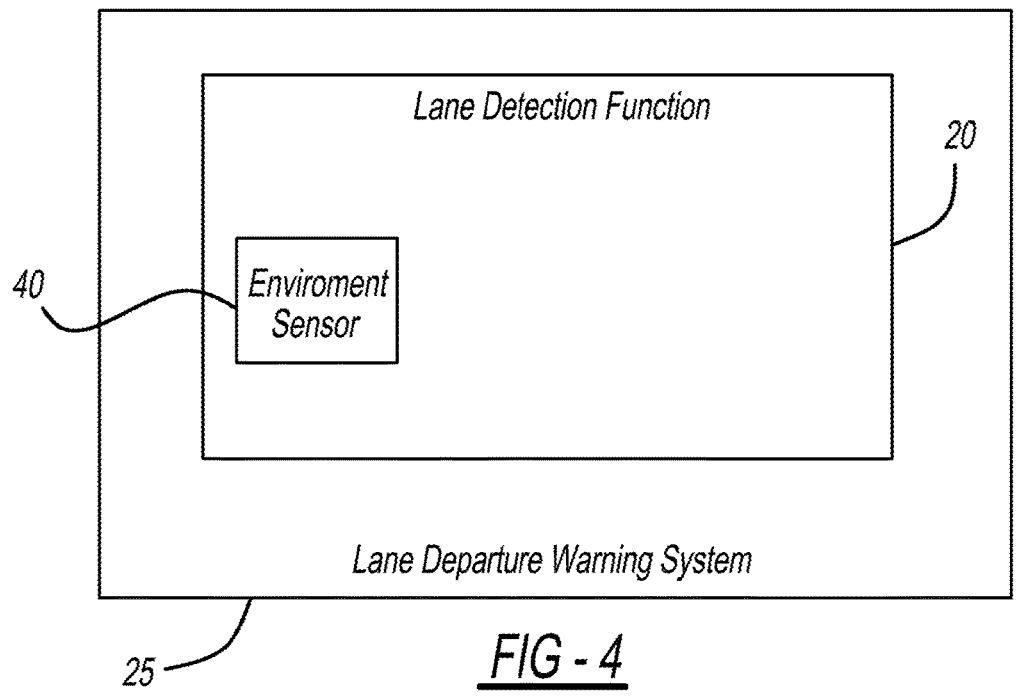
FIG. 4 is a schematic view of a lane departure warning system having the lane detection function including an environment sensor.

The lane detection function 20, in one approach, is part of a lane departure warning system 25 as shown in FIG. 4. The lane departure warning system 25, as part of its function to determine if a vehicle is departing its lane or about to depart its lane, detects the environment of the vehicle 12, such as the type of road being traveled. For example, the lane departure warning system 25 detects whether the vehicle 12 is on a single lane highway or a multi-lane highway. Accordingly, it can detect if the vehicle 12 is traveling in the left lane of a multi-lane highway, as described above. However, it will be appreciated that the lane detection function 20 can be independent of a lane departure warning system of the vehicle 12 and can operate in addition to the separate lane departure warning system. Similarly, the lane detection function 20 can operate as a single system in a vehicle 12 without a lane departure warning system 25.

References to the lane detection function 20 herein will be made without reference to the lane departure warning system 25, but it will be appreciated that such references can apply to a system where the lane detection function 20 is part of the lane departure warning system 25, separate but in use in addition to the lane departure warning system 25, or separate and in use without a lane departure warning system.

With reference again to FIG. 3, the system 10 and controller 14 also includes a vehicle detection function 30. The vehicle detection function 30 can be in the form of a vehicle mounted radar or vision system capable of detecting the presence, location, and/or speed of other vehicles. In another form, the vehicle detection function 30 can be in the form of a receiver that receives a signal broadcast from other vehicles that indicates the presence, location, and/or speed of the other vehicles.

The vehicle detection function 30 detects other vehicles 32 that are driving on the same highway as the driver. More particularly, the vehicle detection function 30 determines whether the other vehicles 32 are approaching the vehicle 12 from behind. Further, the vehicle detection function 30 determines whether other vehicles 32 are approaching from behind and in a right hand lane. The vehicle detection function 30 also detects whether these approaching vehicles 32 are passing the vehicle 12 on the right.

Figure 5:
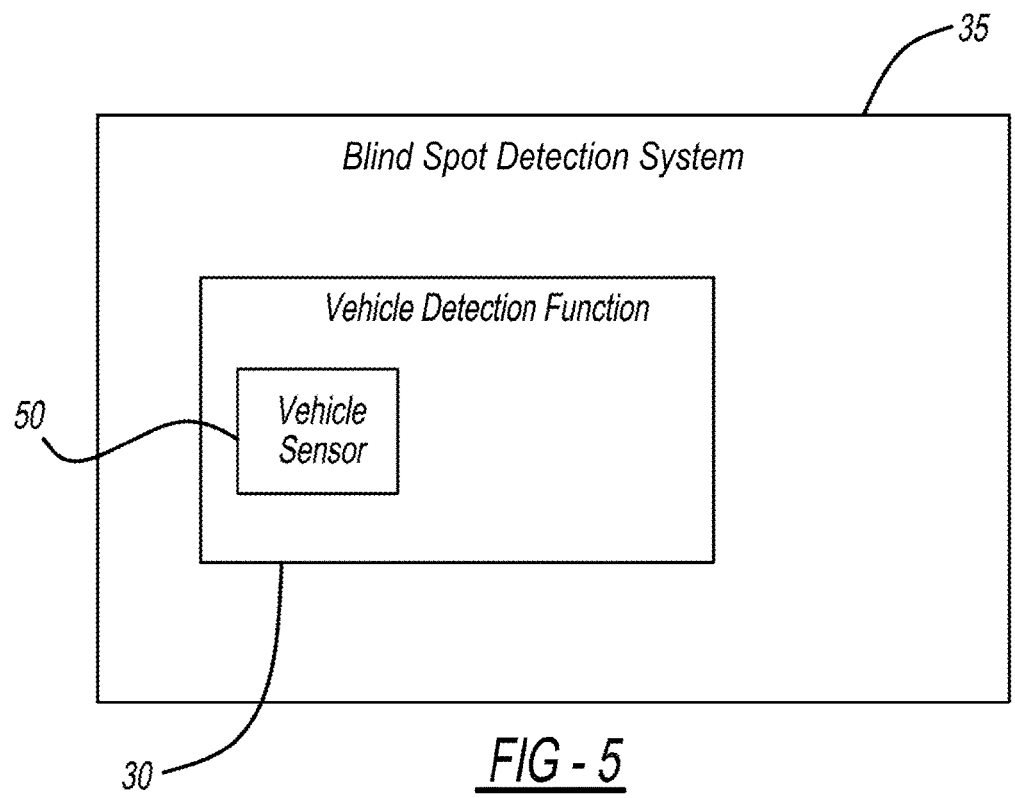
FIG. 5 is a schematic view of a blind spot detection system having the vehicle detection function including a vehicle sensor.

The vehicle detection function 30, in one approach, is part of a blind spot detection system 35 as shown in FIG. 5. The blind spot detection system 35 detects whether the other vehicles 32 are present in the blind spot on the left and/or right side of the vehicle 12. Accordingly, it can detect whether other vehicles 32 are passing the vehicle 12 on the right side. It will be appreciated that the vehicle detection function 30 could be independent of the blind spot detection system 35, operating in addition to the separate blind spot detection system 35. Similarly, the lane detection function 20 can operate without a blind spot detection system installed in the vehicle 12.

References to the vehicle detection function 30 herein will be made without reference to the blind spot detection system 35, but it will be appreciated that such references can apply to a system where the vehicle detection function 20 is part of the blind spot detection system 35, separate but in use in addition to the blind spot detection system 35, or separate and in use without a blind spot detection system.

Figure 6:
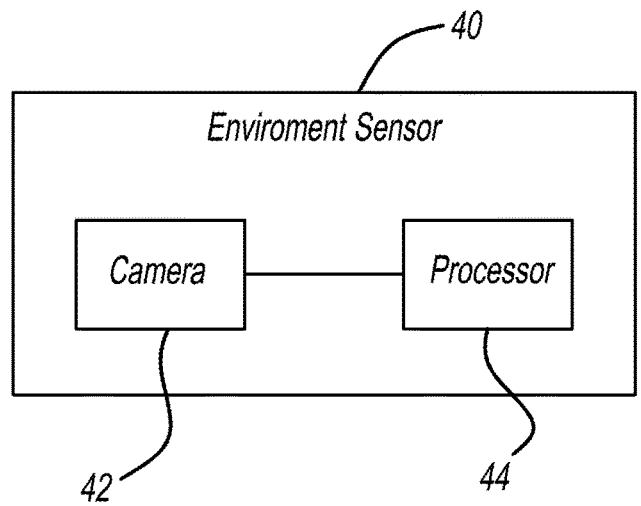
FIG. 6 is a schematic view of the environment sensor having a camera and a processor.

With reference to FIGS. 4 and 6, the lane detection function 20, as described above, detects whether the vehicle 12 is driving in the left lane of a multi-lane highway based on various inputs obtained from the vehicle environment. More specifically, the lane detection function 20 receives outputs from one or more environment or lane detection sensors 40. The lane detection sensors 40 are preferably in the form of one or more cameras 42 that are operably coupled to an associated processing device 44 configured to interpret the images captured by the cameras 42. The processing device 44 can be a part of or in addition to the controller 14. The cameras 42 can be visual cameras or infrared cameras, or other cameras capable of capturing an image sufficient to determine the type of highway being traveled. The processing device 44 evaluates the captured images to determine the type of highway and the lane in which the vehicle 12 is traveling. The lane detection function 20 can operate using cameras or sensors that can detect roadway median lines and road edges, or GPS information can indicate that the current highway on which the vehicle is traveling has multiple lanes in each direction and the particular lane in which the vehicle is traveling. For example, if the cameras 42 capture an image with a solid line on the left side of the vehicle, a dashed line on the right side of the vehicle 12, and a solid line further to the right, the processing device 44 will determine that the vehicle is traveling in the left lane of a two lane multi-lane highway. If the cameras 42 capture a dashed line on the left side of the vehicle and solid line further to the left, with the same dashed line and solid line on the right, then the processing device 44 will determine that the vehicle is traveling in the middle lane of a three-lane multi-lane highway.

It will be appreciated that various other street line configurations can be detected to indicate the lane and type of road in which the vehicle 12 is traveling. The processing device 44 is configured to analyze the images based on predetermined street marking practices of the intended location where the vehicle 12 is likely to be driven, and also preferably includes other known lane marking practices for other areas. The above described manner of determining the type of road and present lane position of the vehicle 12 is merely exemplary, and it will be appreciated that other manners of detecting road type and lane location could also be used, either by using cameras or other location detection devices. For example, the system 10 could analyze the driving habits of the driver to determine if the driver is in the left lane, such as by evaluating previous lane changes. Further, the system 10 could use a GPS system, or other positioning system, to determine a location of the vehicle 12. The GPS or other positioning system can indicate the type of road, such as a single lane highway where passing on the right is typically not possible or permitted due to the lack of an authorized passing lane, or a multi-lane highway where passing on the right is possible due to the presence of the additional lane in which to pass.

Figure 7:
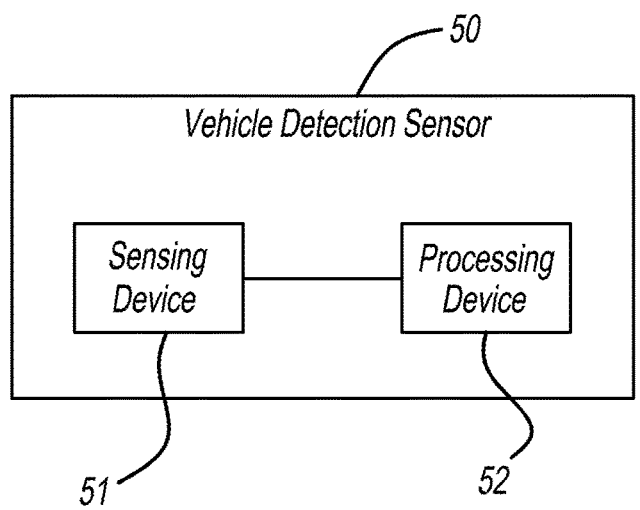
FIG. 7 is a schematic view of the vehicle detection sensor having a sensing device and processing device.
Figure 8:
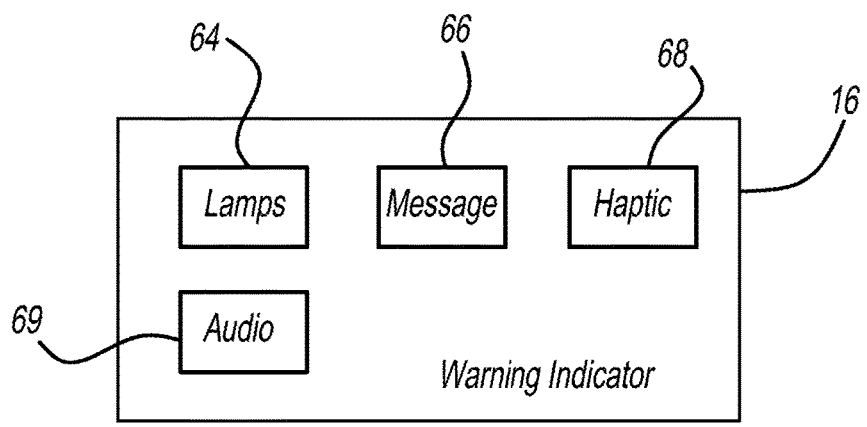
FIG. 8 is a schematic view of the warning indicator, having a lamp warning, a message warning, a haptic warning, and an audio warning.

With reference to FIGS. 5 and 7, the vehicle detection function 30, as described above, detects whether other vehicles 32 are passing the vehicle 12 on the right. The detection occurs based on information received from vehicle detection sensors 50 that include a sensing device 51 that is operatively coupled to a processing device 52. The processing device 52 evaluates the outputs from the sensing device 51 to determine whether a vehicle is passing on the right. In one approach, the sensing device 51 is radar-based, and the information received from the radar is evaluated to determine the movement of the other vehicles 32 relative to the vehicle 12, similar to a radar gun used by law enforcement. Similarly, other devices or sensors that can detect relative speed, movement, or position relative to the vehicle 12 could be used, such as a laser-based system.

For example, the sensing device 51 will output that the other vehicle 32 is present on the right side of the vehicle 12, similar to how a blind spot detection system determines that another vehicle is located in the right side blind spot. The sensing device 51 will also output the speed at which the other vehicle 32 is traveling relative to the vehicle 12. The processor 52 will evaluate these outputs, and determine whether the other vehicle 32 is passing the vehicle 12 on the right. For example, if the location of the other vehicle 32 is confirmed to be on the right side of the vehicle 12, and the other vehicle 32 is confirmed to be traveling faster than the vehicle 12, such as the distance between the vehicles at successive points in time decreasing, the processor 52 will determine that the other vehicle 32 is passing on the right.

The processor 52, as well as the processor 44, can be separate processing devices or as part of the controller 14. For purposes of discussion, the processors 52 and 44 will be discussed individually, but it will be appreciated that the controller 14 could also perform these processing functions.

The processor 52 can make these evaluations regarding being passed on the right relative to a predetermined period of time, and can log instances of the vehicle 12 being passed in a database 54 (FIG. 3) that is operatively coupled to the controller 14.

In one approach, upon detection of the other vehicle 32 on the right side of the vehicle 12, the processor 52 can determine for how long the other vehicle 32 remains in that area. If the other vehicle 32 remains in that area for an extended period of time, for example, two minutes, the processor 52 may determine that the vehicle 12 is not being passed, even if the other vehicle 32 is determined to be traveling slightly faster than the vehicle 12 during portions of that time period. Of course, this time period is merely exemplary, and can be set to other predetermined periods, as desired In one approach, the processor 52 can determine the number of other vehicles 32 that have passed the vehicle 12 during a predetermined period of time. For example, the processor 52 can determine whether or not two or more other vehicles 32 have passed the vehicle 12 within a period of five minutes. This can be accomplished by logging instances in the database 54 and evaluating the number of instances within the predetermined time period. This particularly quantity of passing instances and period of time is exemplary. Other predetermined quantities and periods can also be used, as desired.

In addition to determining whether the vehicle 12 is being passed by other vehicles 32 on the right, the system can also use the vehicle detection function 30 to determine whether the vehicle 12 is being approached from behind but in the same lane. The sensors 52 will determine whether the other vehicle 32 is present in the same lane as the vehicle 12 and whether the other vehicle 32 is traveling at a faster speed than the vehicle 12. The processor 52 will evaluate the location and speed of the other vehicle 32 and output that the other vehicle 32 is fast approaching the vehicle 12. These instances of same lane vehicle approaches can also be logged in the database 54, similar to the instances of right side passes.

It will be appreciated that the vehicle detection function 20 can be used to detect the location and relative speeds of other vehicles at a variety of locations, including the lane or lanes to the left of the vehicle. The vehicle detection function can also detect the presence of other vehicles, as well as their speeds, in lanes that are not adjacent the lane in which the vehicle is driving, such that the other vehicles 32 would be detected two lanes over, three lanes over, etc.

The lane detection function 20 and the vehicle detection function 30 are used together as inputs to a lane discipline reminder function 60, as shown in FIG. 3. The above described detections performed by the sensors and associated processors of the lane detection function 20 and the vehicle detection function 30 are evaluated by the vehicle detection function 60 in order to warn the driver of other vehicles 32 passing on the right, or likely to pass on the right.

If the lane discipline reminder function 60 and the controller 14 determine that the warning indicator 16 should be activated, the controller 14 will cause the warning indicator 16 to be activated.

The warning indicator 16 can have a variety of forms. In one approach, the warning indicator is in the form of a warning lamp 64. In another approach, the warning indicator 16 is in the form of a textual message 66. In another aspect, the warning indicator 16 is in the form of a haptic signal 68, such as a vibration in the steering wheel or seat. Each of these warning indicators 16 are capable of being activated alone, or in a variety of combinations with each other. For example, in one approach, the warning indicator 16 includes each of the warning lamp 64, the textual message 66, and the haptic signal 68. Additionally, or alternatively, the warning indicator 16 can be in the form of an audio warning 69, such as beeping or a spoken phrase. Of course, it will be appreciated that other warning indicators could also be used to alert the driver.

Additionally, or alternatively, to warning the driver, if the lane discipline reminder function 60 determines that the vehicle 12 is being passed on the right by other vehicles 32 sufficiently to prompt a warning, the controller 14 will cause an external driver warning 70 (FIG. 2) to be activated.

Figure 9:
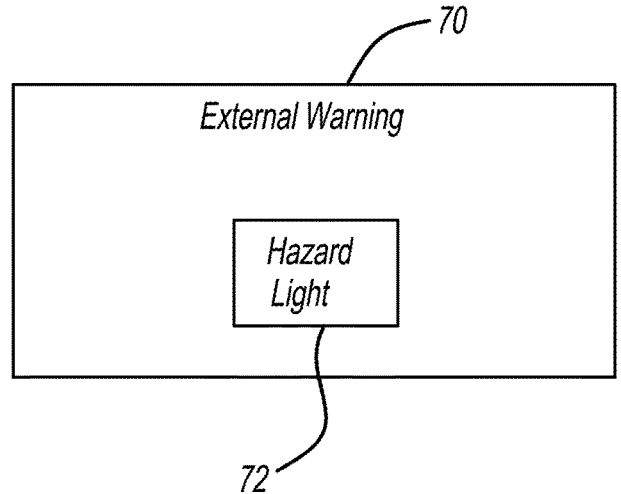
FIG. 9 is a schematic view of the external warning having a hazard light.

The external driver warning 70 is intended to warn other drivers that the vehicle 12 is travelling slower than the other vehicles 32 and is being passed on the right. In this aspect, as shown in FIG. 9, the external driver warning 70 is in the form of a hazard light 72, such as flashing turn signals on both sides of the vehicle 12 or other external warning indicators.

The lane discipline reminder function 60 is configured to activate one or both of the above warnings 16, 70 in response to certain conditions occurring. As described above, the warnings 16, 70 are preferably activated in response to detecting that the other vehicles 32 are passing the vehicle 12 on the right. However, it can be appreciated that it may not be desirable, in certain situations, to activate the warnings 16, 70 in response to a singular incidence of being passed on the right. Accordingly, the lane discipline reminder function 60 will preferably activate one of the warnings 16, 70 in response to the number of passing vehicles reaching a threshold level.

The threshold level is preferably predetermined as a function of a number of other vehicles 32 passing the vehicle 12 as well as a predetermined time period. For example, in one approach, the threshold level is two other vehicles 32 passing the vehicle 12 on the right within a span of two minutes. This threshold level is merely exemplary, and other quantities of passing vehicles within other time periods could also be used as the threshold level.

It will also be appreciated that in certain driving environments or times of day that it is desirable for the lane discipline reminder function 60 to refrain from activating either of the warnings 62, 70. For example, during rush hour the stop and go nature of traffic in all lanes can result in the vehicle 12 being passed by other vehicles 32 multiple times, but the traffic congestion inherent in such situations would make warnings to the driver of vehicle 12 unnecessary or undesirable.

Determining that the vehicle 12 is currently engaged in rush hour or stop-and-go type traffic environments can be performed using various known vehicle and traffic sensors, or by monitoring the speed and speed changes of the vehicle 12, or other known methods via the controller 14 or associated control devices.

Similarly, if the vehicle 12 is present in a city environment rather than a highway environment, it may be desirable to refrain from warning the driver. For example, if the vehicle 12 is traveling between a series of stoplights or stop signs where frequent speed changes commonly occur, the rate at which the vehicle 12 accelerates and decelerates between such traffic control points can result in other vehicles 32 passing the vehicle 12. In such a situation, the vehicle 12 is not hindering traffic flow or the ability of the other vehicles to pass on the left.

Detecting the city environment can be performed by monitoring for speed and speed changes, vehicles and their proximity, camera or GPS recognition, or other known environmental detection methods via the controller 14 or other associated control devices.

Furthermore, it may be desirable to refrain from warning the driver or using the lane discipline reminder function 60 in instances where the vehicle 12 is present in a directional lane. A directional lane is one in which the driver is directed to be present, or one out of which the driver is directed to travel. For example, if the vehicle 12 is in a left-turn lane, the vehicle 12 may be passed by many vehicles, but is not hindering traffic flow, and it would be inappropriate to warn or instruct the driver to merge out of the left-turn lane. In another example, the vehicle 12 could be present in a lane that is about to merge with another highway, and it would be undesirable to warn or instruct the driver to depart from the lane.

Having described the abilities of a preferred embodiment of the system, as well as other aspects of other additional or alternative embodiments, a method 100 for executing the lane discipline reminder function 60 is illustrated with reference to FIG. 10.

Figure 10:
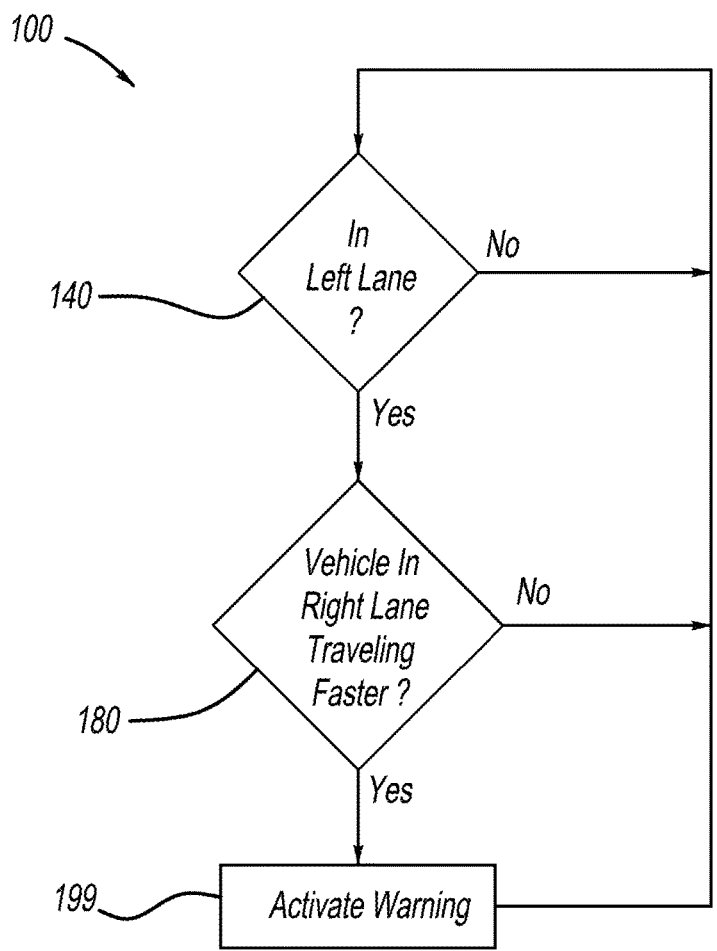
FIG. 10 is an illustration of a method for assisting a vehicle driver.

As shown in FIG. 10, the method 100 for executing the lane discipline reminder is illustrated as a closed loop algorithm. At step 140, the controller 14 will determine, via the lane detect function 20, whether the vehicle 12 is traveling in the left lane of a multi-lane highway. If yes, the method 100 will proceed to the next step. If not, the method 100 will return to the start to continue monitoring for when the vehicle 12 is present in the left lane.

If the controller 14 determines that the vehicle 12 is in the left lane, at step 180 the controller 14 will determine, via the vehicle detection function 30, whether another vehicle is in the right lane traveling faster than the vehicle 12. If yes, the method 100 will proceed to the next step. If not, the method 100 will return to the start to continue monitoring for when the vehicle 12 is present in the left lane.

If the controller 14 determines that another vehicle is in the right lane traveling faster, then the method will proceed to step 199, where the controller 14 will activate the warning indicator 16.

After activating the warning indicator 16, the method 100 will return to the start.

Of course it will be appreciated that modifications to the method 100 are possible according the above described functionality and capabilities of the system 10. For instance, the method could be modified that in the event that no vehicle was detected in the right lane traveling faster, the method 100 could continue to perform step 180 and monitor for vehicles in the right lane traveling faster without returning to the start of the method 100 to determine whether the vehicle was in the left lane. Similarly, after activating the warning indicator 16, the method 100 could return to step 180 to monitor for passing vehicles rather than determining whether the vehicle is in the left lane.

Figure 11B:
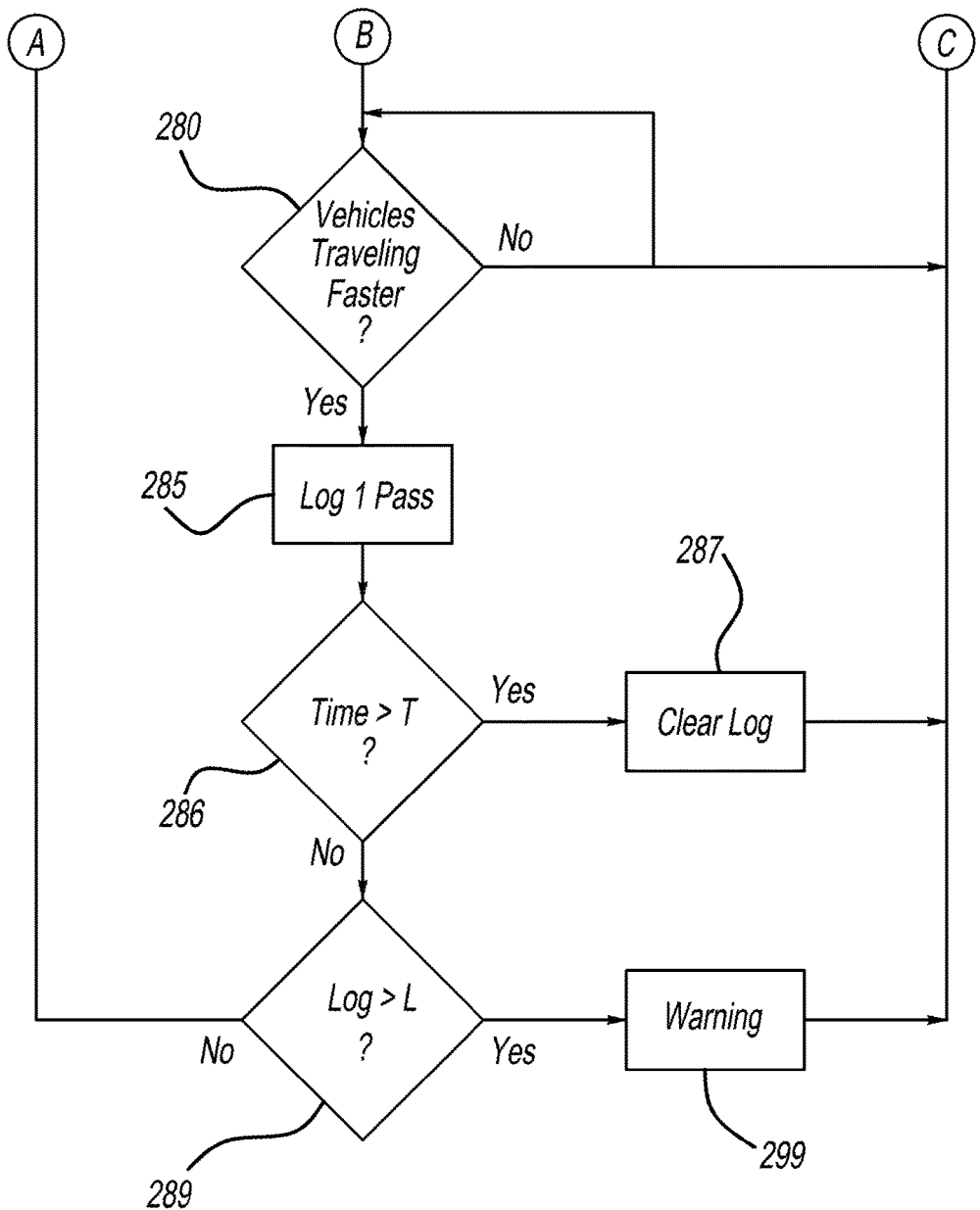

Another embodiment of the use of the system 10 is illustrated as a method 200 is illustrated in FIG. 11.

With reference to FIG. 11, the method 200 begins at step 210 by determining whether the vehicle 12 is traveling in a city or highway environment. This determination can be made by the controller 14 and, in one approach, by the lane detection function 20 and associated components. Of course, other known detection systems for determining a city or highway environment could also be used. If the controller 14 determines that the vehicle 12 is traveling in a city environment, the method 200 will not perform any further steps and will return to the beginning. If the controller 14 determines that the vehicle 12 is traveling in a highway environment, then it will proceed to the next step.

In step 220, the controller 14 will determine whether the vehicle 12 is traveling in a stop and go traffic. This can be determined using known methods for monitoring vehicle speed and changes to vehicle speed. If the controller 14 determines that the vehicle 12 is in stop-and-go traffic, then the method 200 will return to the beginning or will continue monitoring the stop-and-go status of the vehicle 12. If the controller 14 determines that the vehicle 12 is not in stop-and-go traffic, the method 200 proceeds to the next step.

In step 240, the controller 14 determines whether the vehicle 12 is traveling in the left lane of a multi-lane highway as described above with reference to the lane detection function 20. If not, the method 200 will return to the beginning or will continue monitoring to determine whether the vehicle 12 is in the left lane. If the vehicle 12 is determined to be in the left lane, the method 200 will proceed to the next step.

In step 260, the controller 14 will determine if another vehicle is approaching from behind as described above with reference to the vehicle detection function 30. If not, the method 200 will return to the beginning or to continue monitoring to determine if another vehicle is approaching from behind. If another vehicle is determined to be approaching, the method 200 will proceed to the next step.

In step 270, the controller 14 will determine if the additional vehicle is in the right lane. If not, the method will return to the beginning or will continue to monitor to determine if another vehicle is present in the right lane. If the other vehicle is in the right lane, then the method 200 will proceed to the next step.

In step 280, the controller 14 will determine if the other vehicle, approaching from behind and in the right lane, is traveling faster than the vehicle 12. If not, the method 200 will return to the beginning or will continue to monitor to determine when the other vehicle is traveling faster.

If it is determined that the other vehicle is traveling faster at step 280, the method 200 will proceed to step 285, where the controller 14 will log in the database 54 that the vehicle 12 has been passed.

After logging an instance of the vehicle being passed at step 285, the controller 14 will monitor a period of time from the first logged instance. If the elapsed time exceeds a predetermined period of time T, then the method 200 will clear the log 54 at step 287.

If the elapsed time has not exceed time T, then the controller 14 will determine whether the number of logged instances exceed a predetermined quantity L. If the number of logged instances exceeds the quantity L, then the method 200 will output a warning at step 299. The warning can be in the form of any of the warning indicators 16 described above. After outputting the warning, the method 200 will return to the beginning to continue monitoring.

If the number of logged instances is less than quantity L, then the method 200 will return to step 240, where it will monitor to determine if the vehicle 12 is in the left lane. The method 200 will continue to repeat steps 240, 260, 270, and 280, and will continue to log instances of the vehicle 12 being passed, until such point as the number of passing instances exceeds the predetermined quantity L within the predetermined time period T.

The above described method 200 is one example, and it will be appreciated that various steps could be modified to suit the needs of the user. For example, in the case where a determination is made such that the method 200 will go back to the beginning, the method 200 can be altered to go back to a particular step instead of the beginning, if desired. It may be desirable to return to an intermediate step without conducting preceding steps if the preceding steps are unlikely to result in a different condition. These determinations can be based on elapsed times or other events that would trigger whether an earlier step should be repeated. For example, if a relatively short period of time has elapsed, it is more likely that the vehicle 12 is still in the left lane, and repeating the step to determine whether the vehicle 12 is in the left lane may not be necessary.

The above description has related to driving conventions in the United States, where vehicles typically travel on the right side of the road. It will be appreciated that the system could also be used where it is typical for vehicles to travel on the left side of the road, such as in England or other foreign countries with similar driving conventions. In such an instance, references to the left and right lanes, and left and right positions relative to the vehicle 12 would be reversed.

The features of the subject matter of this case as set forth in the herein above description, the patent claims, the summary, and the drawings, can be important individually or in desired combinations with one another in order to realize the invention in its various forms.

The present invention is, of course, in no way restricted to the specific disclosure of the specification and drawings, but also encompasses any modifications within the scope of the appended claims. The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for assisting a driver of a passenger vehicle, the method comprising:
   providing a controller installed within the passenger vehicle, wherein the controller receives outputs from at least one of a camera and a radar device for detecting at least one of the location of the passenger vehicle, the location of a second vehicle, and the speed of the second vehicle, wherein the controller is in the form of a computer readable medium having instructions stored thereon and a processor that executes the instructions causing the controller to perform the steps of:
   automatically detecting, by the controller performing a lane detect function and independent from driver or passenger perception, that the passenger vehicle is traveling on a roadway having at least two lanes for legally permissible public travel in a first direction including one or more predetermined passing lanes and a predetermined non-passing lane;
   automatically detecting, by the controller performing the lane detect function and independent from driver or passenger perception, that the passenger vehicle is traveling in one of the one or more predetermined passing lanes of the at least two lanes;
   automatically detecting, by the controller performing the vehicle detect function and independent from driver or passenger perception, that a second vehicle is behind the passenger vehicle and traveling in one of the at least two lanes;
   automatically detecting, by the controller performing the vehicle detect function and independent from driver or passenger perception, that the second vehicle is traveling faster than the passenger vehicle;
   automatically determining, by the controller based on outputs from the lane detect function and the vehicle detect function and independent from driver or passenger input, that the passenger vehicle is hindering traffic flow; and
   in response to the controller determining that the passenger vehicle is hindering traffic, automatically outputting an instruction from the controller to depart from the predetermined passing lane toward the predetermined non-passing lane.

2. The method of claim 1, wherein the instruction comprises a warning that instructs the driver to merge toward the non-passing lane.

3. The method of claim 1, further comprising detecting whether the passenger vehicle is engaged in stop-and-go traffic, and performing the method only in response to determining that the passenger vehicle is not engaged in the stop-and-go traffic.

4. The method of claim 1, further comprising detecting whether the vehicle is traveling in a city environment or a highway environment, and performing the method only in response to determining that the passenger vehicle is traveling in the highway environment.

5. The method of claim 1, wherein the instruction is at least one of an audible warning, a text-based warning, and a haptic warning.

6. The method of claim 1, further comprising detecting, by the controller performing the lane detect function, whether the passenger vehicle is present in a directional lane, wherein a directional lane is a lane in which the driver is directed to be present for preparing to leave the roadway, and performing the method only in response to determining that the passenger vehicle is not present in a directional lane.

7. The method of claim 1, further comprising outputting an external warning to alert drivers of other vehicles that the passenger vehicle is being passed by other vehicles in the non-passing lane.

8. The method of claim 1, further comprising determining, by the controller performing the vehicle detect function, that the second vehicle has passed from behind the passenger vehicle to forward of the passenger vehicle, and the determining that the passenger vehicle is hindering traffic flow is performed in response to detecting that the second vehicle has passed from behind the passenger vehicle to forward of the passenger vehicle.

9. The method of claim 1, further comprising detecting, by the controller performing the vehicle detect function, that the second vehicle is approaching the passenger vehicle from behind in the same lane as the passenger vehicle, and the determining that the passenger vehicle is hindering traffic flow is performed in response to detecting that the second vehicle is approaching the passenger vehicle from behind.

10. The method of claim 1, wherein the outputting of the instruction is performed in the absence of an indication by the driver to depart the passing lane, wherein the indication is detected by the controller.

11. The method of claim 1, further comprising logging an instance in a database of the controller that the second vehicle has passed the passenger vehicle; and detecting, by the controller performing the vehicle detect function, that at least one additional vehicle in addition to the second vehicle has passed the passenger vehicle and logging the at least one additional vehicle to define a number of passing vehicles.

12. A method for assisting a driver of a passenger vehicle, the method comprising:
providing a controller installed within the passenger vehicle, wherein the controller receives outputs from at least one of a camera and a radar device for detecting at least one of the location of the passenger vehicle, the location of a second vehicle, and the speed of the second vehicle, wherein the controller is in the form of a computer readable medium having instructions stored thereon and a processor that executes the instructions causing the controller to perform the steps of:
automatically detecting, by the controller performing the lane detect function and independent from driver or passenger perception, that the passenger vehicle is traveling;
automatically detecting, by the controller performing the lane detect function, that the passenger vehicle is traveling in a passing lane of the at least two lanes;
automatically detecting, by the controller performing a vehicle detect function and independent from driver or passenger perception, that the second vehicle is traveling in a non-passing lane of the at least two lanes, wherein the non-passing lane is different than the passing lane;
automatically detecting, by the controller performing a vehicle detect function and independent from driver or passenger perception, that the second vehicle is behind the passenger vehicle;
automatically detecting, by the controller performing the vehicle detect function and independent from driver or passenger perception, that the second vehicle is traveling faster than the passenger vehicle;
automatically detecting, by the controller performing the vehicle detect function and independent from driver or passenger perception, that the second vehicle has passed and is ahead of the passenger vehicle
automatically outputting a warning from the controller to the driver, wherein the warning instructs the driver to depart from the passing lane after detecting that the second vehicle is ahead of the passenger vehicle;
logging an instance in a database of the controller that the second vehicle has passed the passenger vehicle;
automatically detecting, by the controller performing the vehicle detect function and Independent from driver or passenger perception, that at least one additional vehicle in addition to the second vehicle has passed the passenger vehicle and logging the at least one additional vehicle to define a number of passing vehicles;
wherein the outputting the warning is performed in response to logging that the second vehicle and the at least one additional vehicle has passed the passenger vehicle.

13. The method of claim 12, wherein the outputting the warning is performed in response to the number of passing vehicles exceeding a predetermined threshold level.

14. The method of claim 12, further comprising measuring an elapsed time from a time corresponding to the logging in the database of the instance of the second vehicle passing the first vehicle, wherein the logging of the instance of the second vehicle passing the first vehicle comprises an initial instance.

15. The method of claim 14, further comprising clearing the log in response to the elapsed time exceeding a predetermined level, wherein the log is cleared in response to detecting no further vehicles in addition to the second vehicle during the elapsed time, wherein a further instance of detecting a further second vehicle passing the passenger vehicle after the elapsed time comprises the initial instance.

16. An apparatus for providing lane discipline assistance to a driver of a first vehicle, the apparatus comprising, the apparatus receiving outputs from at least one of a camera and a radar device for detecting at least one of the location of the passenger vehicle, the location of a second vehicle, and the speed of the second vehicle, a computer readable medium having instructions stored thereon that, when executing by a computing device, cause the computing device to perform steps comprising:
automatically detecting, via a lane detect function and independent from driver or passenger perception, that the first vehicle is traveling on a multi-lane highway having at least two lanes for legally permissible public travel in a first direction including a predetermined non-passing lane and one or more predetermined passing lanes and detecting that the first vehicle is traveling in one of the passing lanes of the multi-lane highway:

automatically detecting, via a vehicle detect function and independent from driver or passenger perception, that the second vehicle is traveling on the multi-lane highway behind the first vehicle and at a faster speed than the first vehicle;

automatically determining, based on outputs from the lane detect function and the vehicle detect function and independent from driver or passenger input, that the first vehicle is hindering traffic flow; and in response to determining that the first vehicle is hindering traffic flow, automatically outputting an instruction to depart from the predetermined passing lane toward the predetermined non-passing lane.

17. The apparatus of claim 16, wherein the vehicle detect function includes the radar device to determine whether the second vehicle is traveling faster than the first vehicle.

18. The apparatus of claim 16, wherein the lane detect function includes the camera and an associated image processor to detect that the first vehicle is traveling in a multi-lane highway.

19. The apparatus of claim 16, wherein the determination that the first vehicle is hindering traffic flow is made in response to detecting that the second vehicle is traveling in the non-passing lane and that the second vehicle has passed the first vehicle by traveling in the non-passing lane, and the instruction instructs the driver to merge into the lane where the second vehicle had been detected.

20. The apparatus of claim 16, wherein the passing lane is a left lane and the non-passing lane is a right lane.

* * * * *